May 27, 1947.  W. F. GROENE  2,421,147
ORBITAL LATHE FEED MECHANISM
Filed Aug. 5, 1944  8 Sheets-Sheet 4
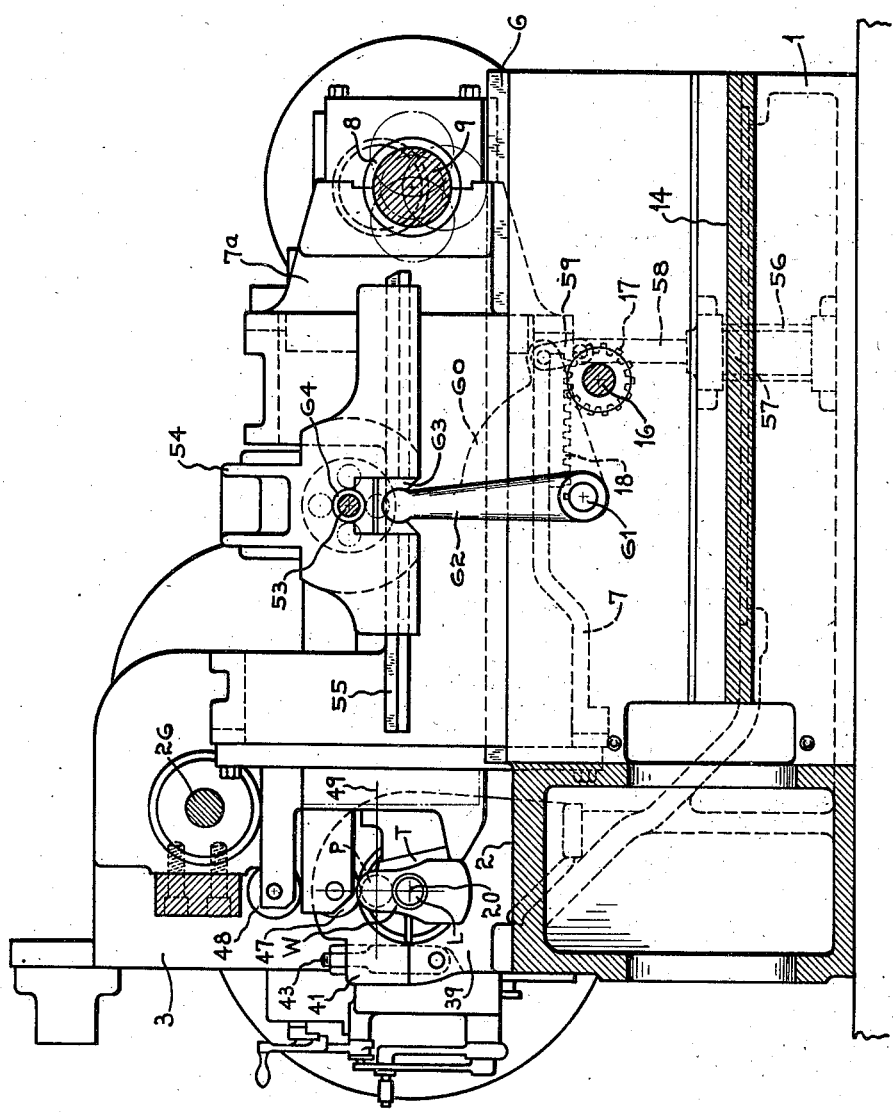
FIG. IV
INVENTOR.
WILLIAM F. GROENE
BY
Toulmin & Toulmin
ATTORNEYS

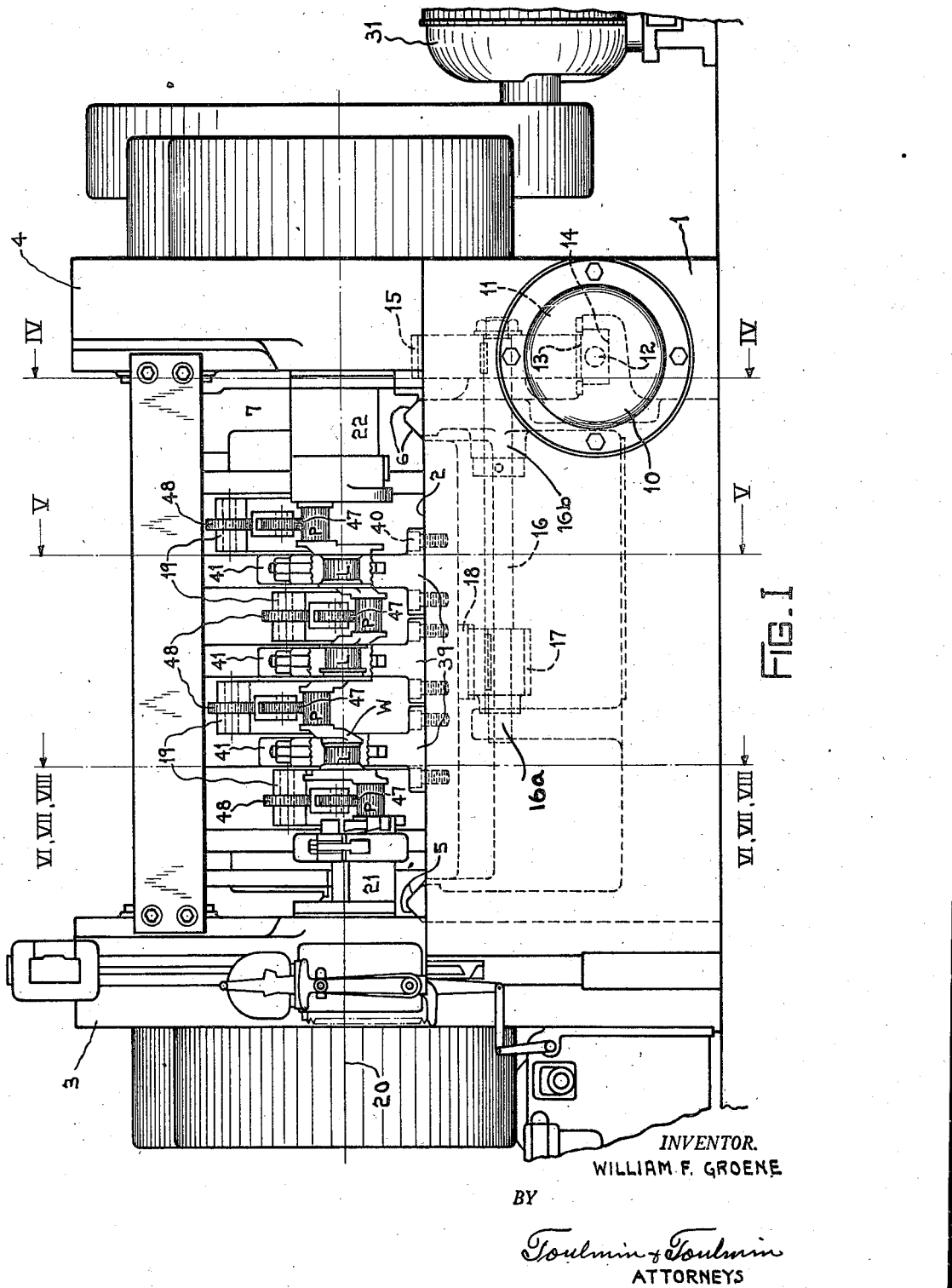

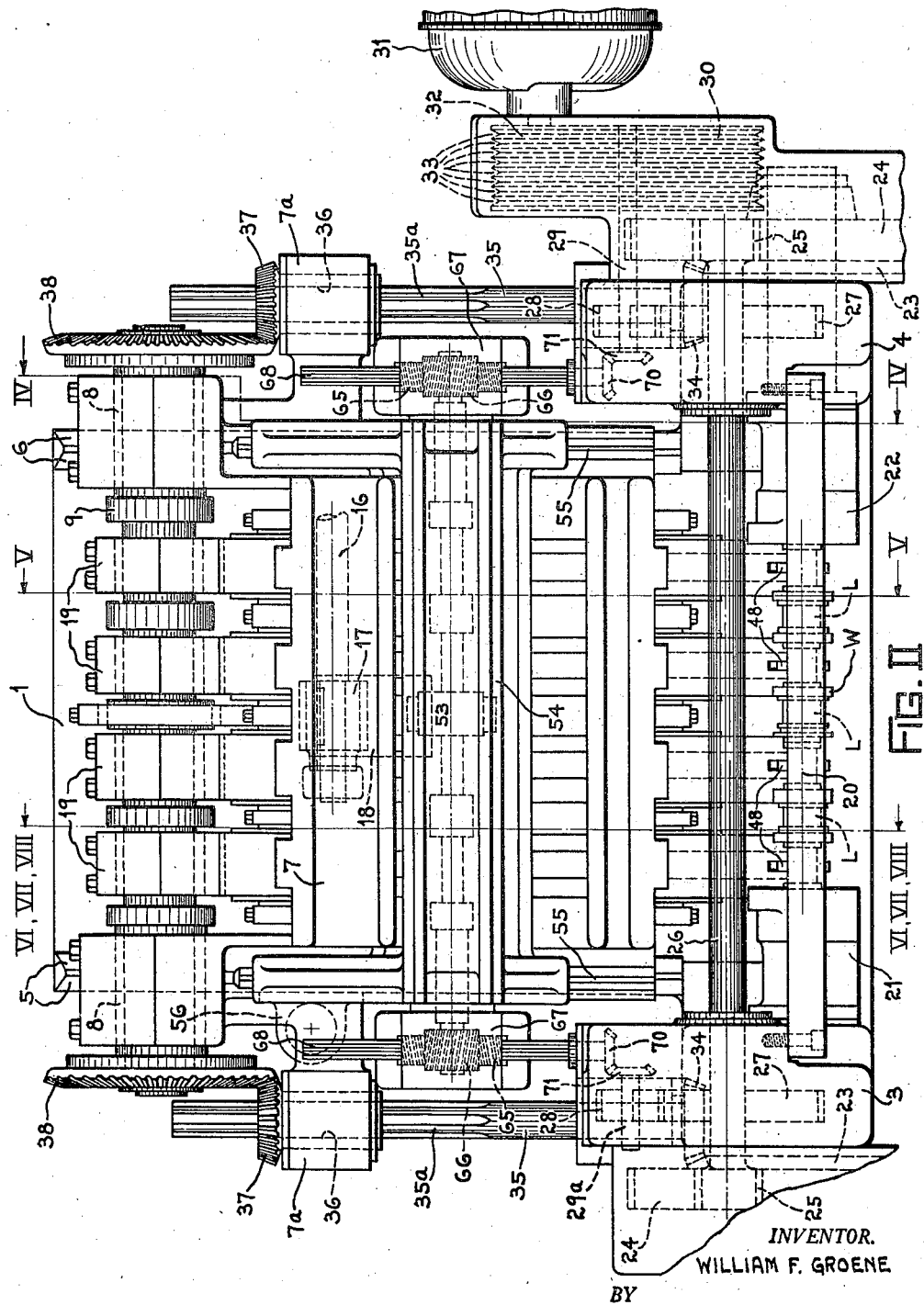

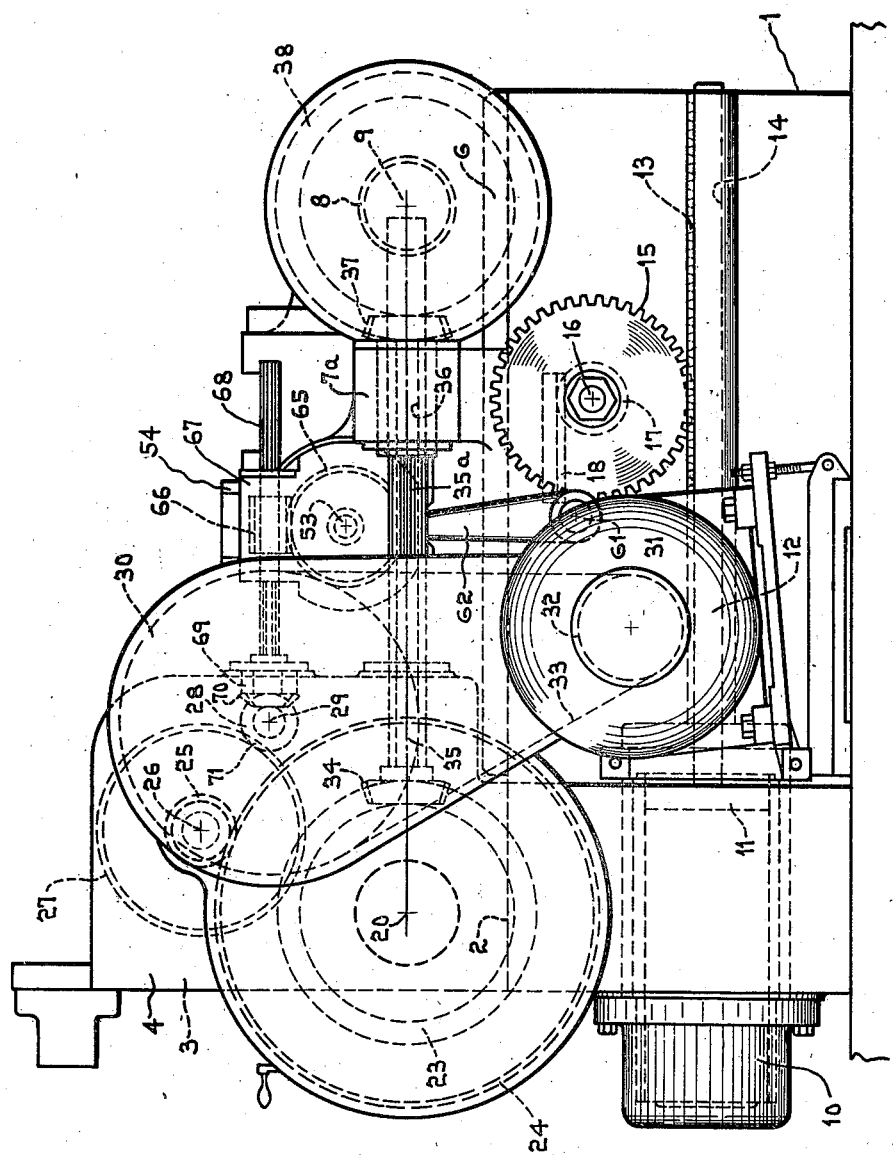

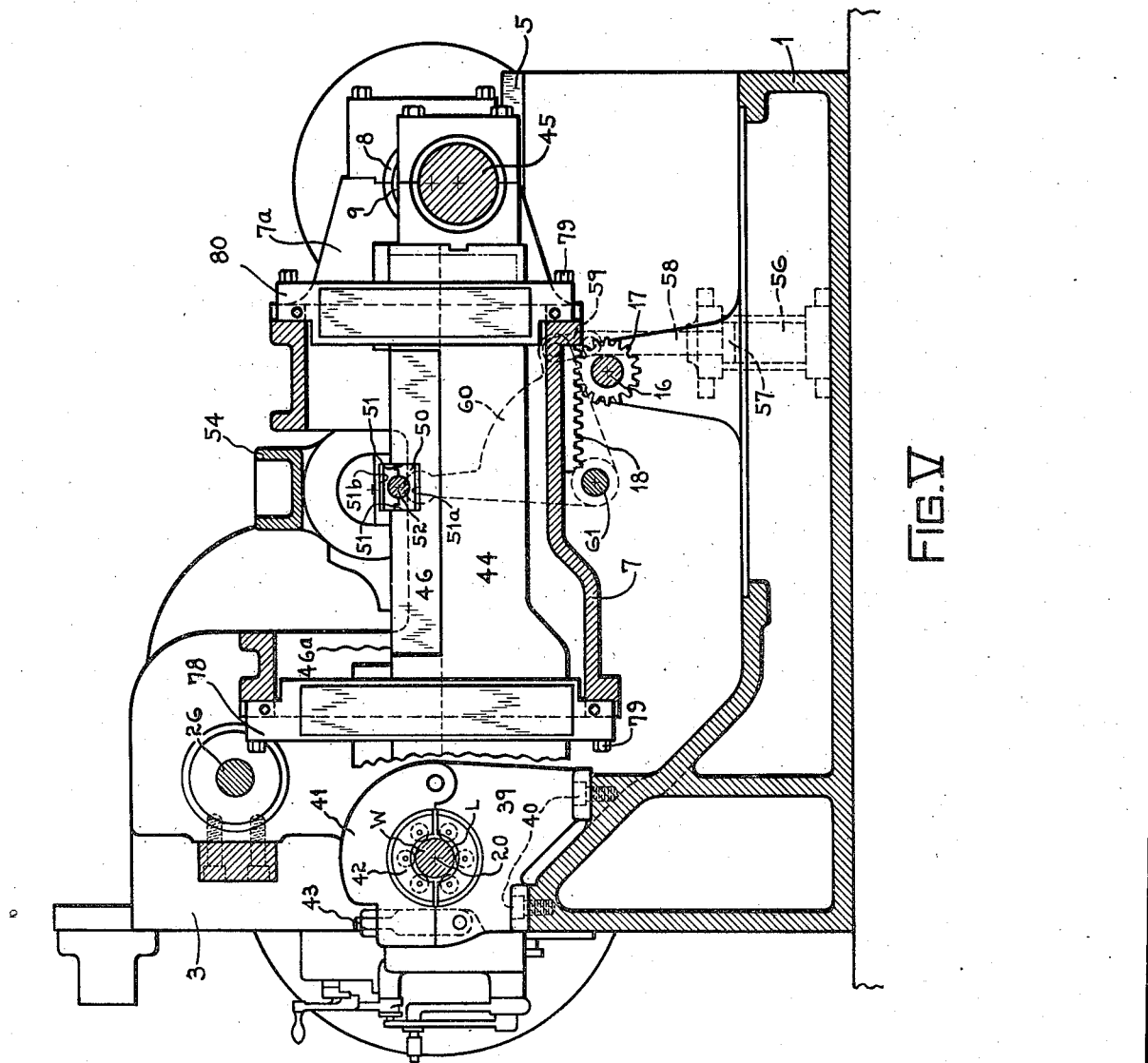

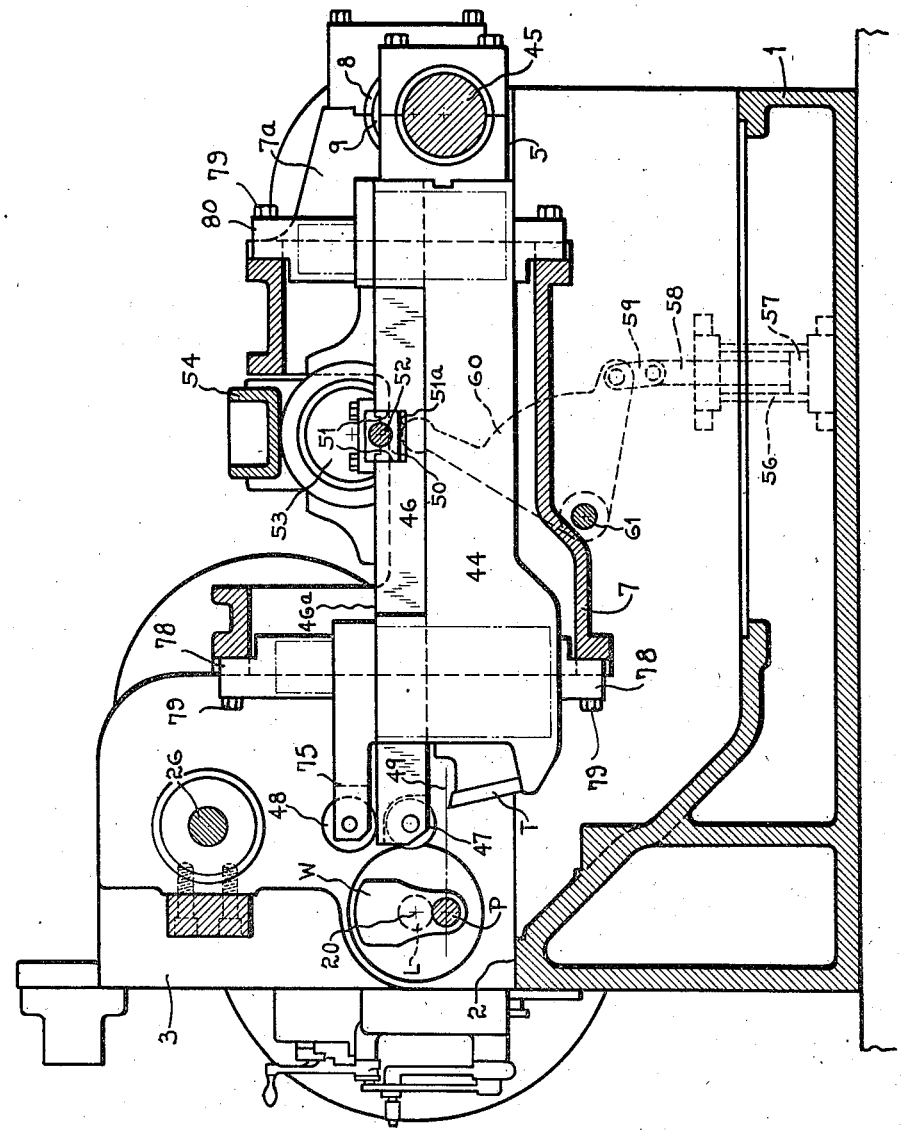

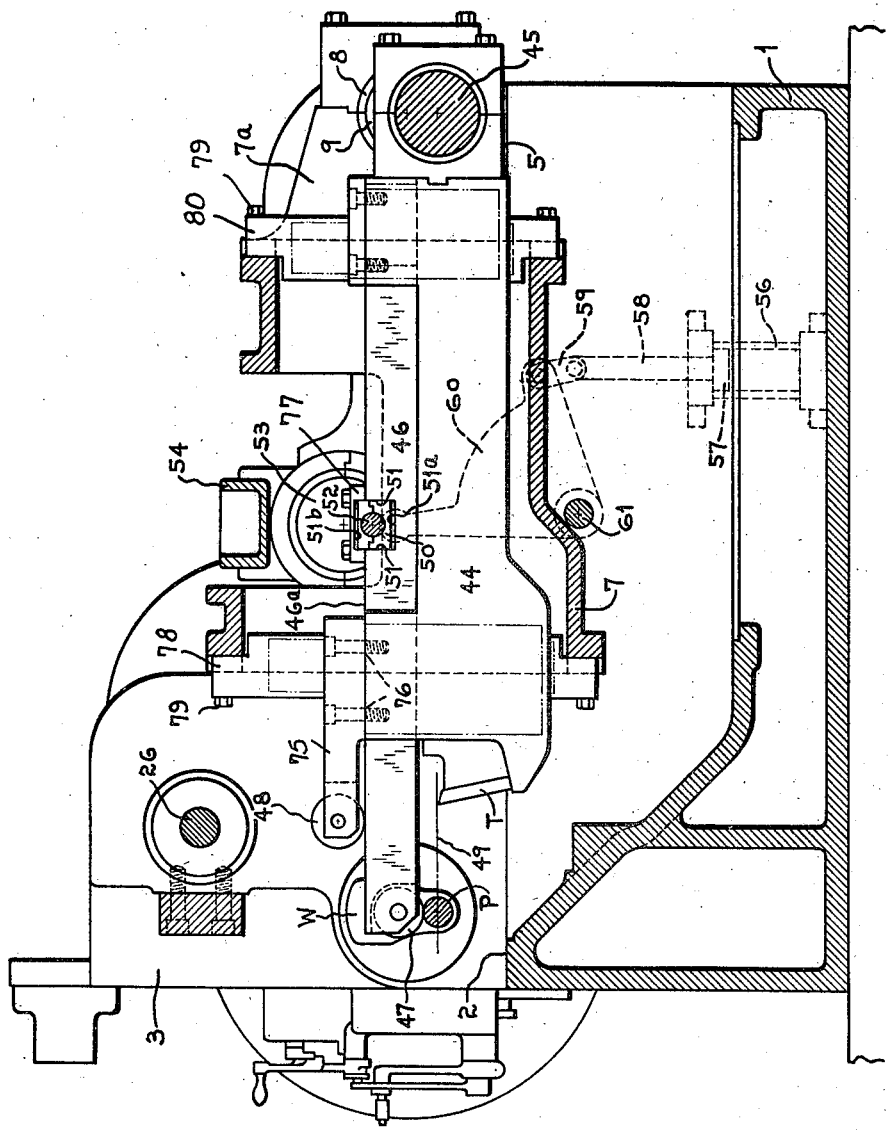

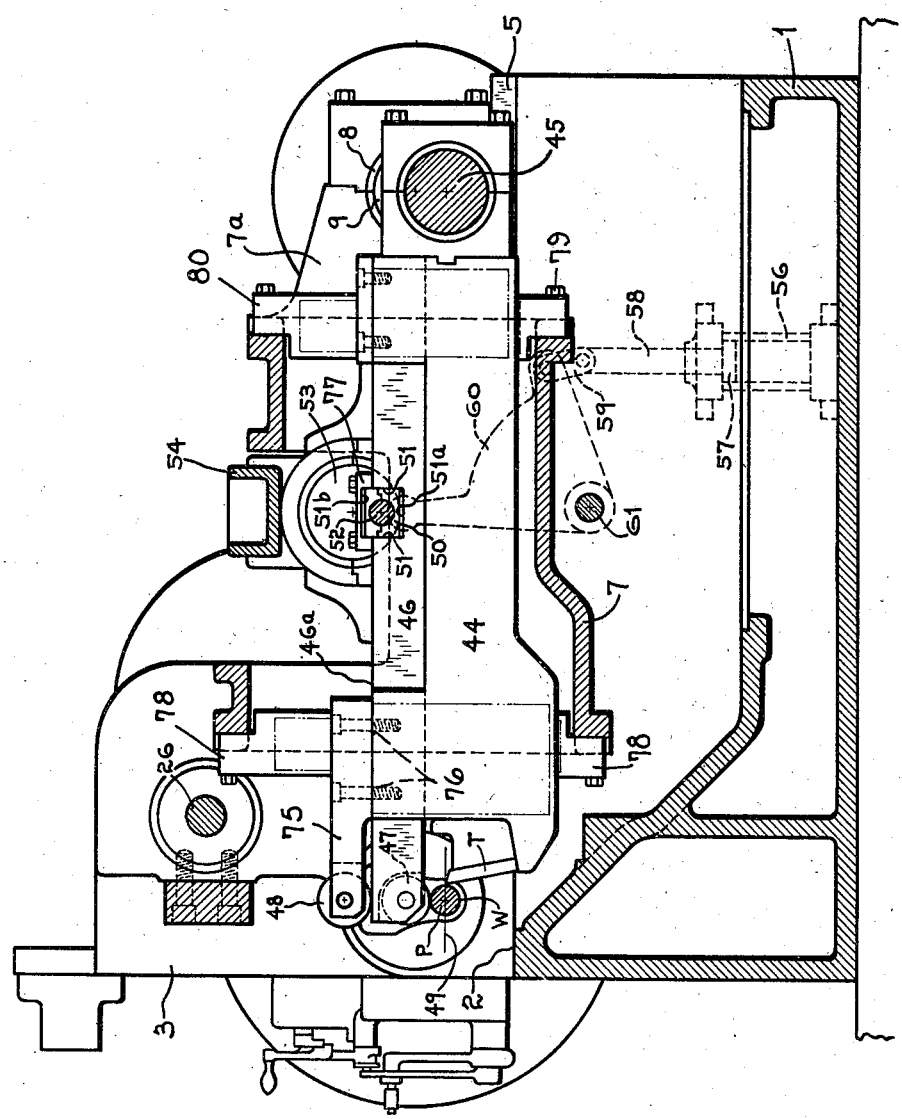

Patented May 27, 1947

2,421,147

UNITED STATES PATENT OFFICE 2,421,147

ORBITAL LATHE FEED MECHANISM

William F. Groene, Cincinnati, Ohio, assignor to The R. K. Le Blond Machine Tool Co., Cincinnati, Ohio, a corporation of Delaware Application August 5, 1944, Serial No. 548,189

13 Claims. (Cl. 82—9)

This invention relates to orbital lathes and more particularly to improvements in the feed mechanisms of such lathes and a unique combination therewith of tool supporting and moving mechanism.

One object of the invention is to provide a method and apparatus wherein turning or facing of orbitally moving surfaces is effected by supporting at least a portion of each tool carrier upon the orbitally moving part being worked upon.

Another object of the invention is to provide relatively movable supports for the tool carriers in a lathe of the type described wherein feeding of the tools to the work is effected by bodily moving only one support.

Another object is to provide a supplemental support for each tool carrier acting only while the lathe is being loaded and unloaded, in combination with means for shifting a support on and for the tool carrier into work-supported position thereby relieving the load on said supplemental support.

A still further object is to provide two relatively movable means for orbitally moving the tool carrier said means being nevertheless connected for synchronous rotation at all times.

A still further object is to provide a master support for the tool carrier and a supplemental support operable to shift an auxiliary support on the carrier into work supported position.

Another object relates more particularly to a method of, and apparatus for, floatingly mounting a tool carrier unit on the work piece so that relatively long radial cuts such as the machining of the cheeks and associated fillets of the webs of a crankshaft may be accomplished with an extremely high degree of accuracy while at all times maintaining the cutting edge of the tool in exact radial alignment with the work surface being cut.

A still further object is to provide a lathe having a master crankshaft rotating in synchronism with the work piece crankshaft and to provide a secondary crankshaft also rotating in synchronism with said first mentioned master crankshaft and work spindle, which carries a movable member in the tool carrier unit mounted on the master crankshaft, in such a way that this movable member may be maintained at all times in floating engagement with the work piece, while the tool carrier as a whole, moves to and from the work bringing the tool radially into or out of cutting position while maintaining an exact uniform pass of feeding to and from the crank pin of the crankshaft.

Another object of this invention is to provide in connection with an orbital tool carrier of an orbital lathe, means whereby the tool holder is supported at one point on a master crankshaft rotating in synchronism with the work piece crankshaft being turned, and to provide a movable member in this orbital tool carrier which may be presented to and from the work piece being machined and which provides the floating contact member of the orbital tool carrier unit on the work during all cutting operations of the cutting tool of the tool unit on the work piece.

Further objects and advantages of this invention will appear in the detail description of the drawings in which:

Figure I is a front elevational view of an orbital type lathe incorporating the features of this invention.

Figure II is a plan view of the machine particularly showing the general location of the rear master crankshaft, the supplemental crankshaft, the orbital tool carrier units, and the work spindle and driving mechanism therefor.

Figure III is a right hand end elevation particularly showing the main drive motor and associated drive gearing to the work spindle, the rear master crankshaft, the supplemental guide crankshaft, and the means for actuating the feeding frame toward and from the work.

Figure IV is a vertical transverse section through the lathe on the line IV—IV of Figures I and II particularly showing the main orbital tool carrier slide housing, the supplemental crankshaft housing movable thereon, and the actuating mechanism for moving the latter.

Figure V is a vertical transverse section through the lathe on the line V—V of Figures I and II particularly illustrating the outward appearance of an orbital tool carrier unit and spacing members together with a steady rest for supporting those line bearings of the work crankshaft intermediate the end driving chucks of the lathe.

Figure VI is a vertical transverse section on the line VI—VI of Figures I and II showing the relative position of the orbital tool carrier unit with the sliding work engaging member withdrawn from contact with the work piece and with the tool unit completely withdrawn away from the work to permit loading and unloading of work in the chucks and spindles of the lathe.

Figure VII is a vertical transverse section on the line VII—VII of Figures I and II particularly illustrating the initial engagement of the sliding work engaging portion of the orbital tool carrier unit on the work piece crankshaft with the orbital tool unit and its cutting tools withdrawn prior to the beginning of a cutting stroke.

Figure VIII is a vertical transverse section on the line VIII—VIII of Figures I and II showing the relative position of the sliding work engaging member of the tool holder and orbital tool carrier with the cutting tool fed into depth on a crank pin of the work crankshaft.

In general, the lathe embodying this invention comprises a base portion having work spindles and chucks to receive respective ends of the work. The two spindles are power driven whereby the work is supported and positively rotated at each end. A series of tool holders corresponding in number to the surfaces of the workpiece to be simultaneously operated upon are mounted upon a frame. This frame is shiftable on the base by a power drive to feed the tools into the work. A master crankshaft is journaled on the frame and has a number of throws or cranks not less than the number of tool holders being used. Each tool holder is journaled on a respective crank. A second frame or cradle is slidable on the frame by a power drive, in a direction parallel to the direction of movement of the first frame on the base. Each tool carrier has a bar member slidably attached thereto and the ends of these members carry rollers or equivalent means adapted to ride on and be supported by, an orbitally-moving part of the workpiece. A supplemental crankshaft similar in number of cranks and diameter of throw to the master crankshaft, is journaled on the cradle.

Each of the bar members is journaled on a respective crank of this supplemental crankshaft. Power driven connections are provided whereby the workpiece and two crankshafts are rotated in exact synchronism whereby each tool on the respective tool carriers is moved in a path corresponding to the path of the surface being worked. Before the start of a work operation, the power means are operated to shift the cradle and bring each roller into position where it is supported upon a respective part of the workpiece. This action relieves the bearing pressure upon the cranks of the supplemental crankshaft. The workpiece is then rotated and the power means driving the frame is then operated to feed the tools into the work. During this operation, of course, the cradle remains in fixed spaced relation to the work so that the rollers remain in supported position upon the work. During the work operation, each tool carrier is supported at two points, viz., a point remote from the work on the master crankshaft, and a second point on the work itself.

The orbital lathe of the present invention has a base 1 formed with upright housings 3 and 4, (Figures I, II, and III) at its left and right hand ends, respectively, as seen in Figure I. Parallel V-guides 5 and 6 are mounted on the top surface 2 of base 1 running from front to back of the machine between the two upright housings 3 and 4. The orbital tool carrying feeding frame 7 is slidably mounted upon these V-guides.

Rib portions 7a are cast integrally with or rigidly attached to frame 7. Each portion carries a bearing 8 in which a rear master crankshaft 9 is journaled. The function of this crankshaft will be subsequently described. The frame 7 is actuated, for feeding the tools into the work, by mechanism that may comprise a cylinder 10 (Figures I and III), having a piston 11 driving a piston rod 12. The piston is reciprocated hydraulically by suitable connections to a pressure source, not shown.

A guide surface 14 is carried on base 1 at the lower right-hand side as seen in Figure I. This guide 14 extends parallel to V-guides 5 and 6 and supports and guides a rack 13 to which piston rod 12 is adjustably connected. A shaft 16 is journaled in appropriate bearings 16a, 16b, Figure I and it will be seen by reference to said figure that shaft 16 extends from the right hand side a little past the center-line of the machine. The right hand end of this shaft has a gear 15 keyed thereto. This gear meshes with and is driven by rack 13. Said shaft carries a pinion 17 keyed thereto adjacent bearing 16a. Pinion 17 in turn meshes with a rack 18, (Figure IV), fixed to the under side of frame 7. Thus, as piston 11 reciprocates in its cylinder 10, frame 7, master crankshaft 9 and orbital tool carrier units 19 (later to be described) are reciprocated to and from the work spindle axis 20 of the lathe (Figures I and III) and the workpiece W mounted for rotation on said axis.

Chucking devices 21 and 22 are journaled in respective housings 3 and 4, each device being connected to a work spindle carrying bevel gears 23 and main drive gears 24. A drive shaft 26 is mounted in bearings carried by the housings 3 and 4. This shaft extends along the top of the machine and slightly to the rear of the work spindle axis 20, as seen in Figure III. Said shaft 26 has pinions 25 fixed thereto at opposite ends, each pinion meshing with and driving a respective one of the main drive gears 24. Shaft 26 also has gears 27 keyed to its ends and the right hand gear 27 is driven from the main drive motor 31 by a reduction drive including the main motor pulley 32, belts 33, main driven pulley 30 and pinion 28 meshing with gear 27 previously mentioned. Driven pulley 30 and pinion 28 are fixed to a common shaft 29, carried in bearings in the housing 4 near the top as seen in Figure III. By this construction both of the chucking devices 21 and 22 are rotated in synchronism by motor 31 whereby the crankshaft or other workpiece W is driven at both ends.

Shafts 35 extend from front to rear of the machine at opposite sides thereof as seen in Figure II. At their forward ends, each shaft is journalled in a bearing carried by housings 3 and 4, respectively. The rear ends of said shafts are splined as at 35a and each slidably passes through a splined bore 36 of bevel gears 37. These gears are rotatably supported in bearings 7a rigidly attached to feeding frame 7. Each gear 37 meshes with a respective gear 38 attached to the ends of the master crankshaft. At their forward ends, shafts 35 carry bevel pinions 34 which mesh with, and are driven by, bevel gears 23, Figure III, formed integrally with or attached to main drive gears 24. The gear ratios are so chosen that gears 38 are rotated in exact synchronism with the work spindles carrying respective chucking devices 21 and 22 whereby the workpiece and master crankshaft are at all times rotated synchronously. At the same time, the frame 7 and all parts carried thereby, including master crankshaft 9 may be moved bodily toward and from the workpiece by reason of the splines 35a and the correspondingly splined bores 36 in bevel gears 37.

Referring now particularly to Figures I and V, a series of steady rests 39 are shown appropriately fixed to base 1 as by bolts 40. In the illustration of Figure I, a four-throw, five bearing crankshaft is shown in the machine. Hence, three steady rests are shown, one for each intermediate main bearing, the two main end bearings being held in the chucking devices 21 and 22. By this arrangement, the work piece is supported at the maximum number of locations throughout its length whereby it is rigidly supported against lateral flexure during the turning operation.

As the machine is shown operating upon a four-throw crankshaft four tool units are used and it will be understood that all units are substantially identical so that only one unit need be described. Each unit comprises a main body portion or tool carrier 44 (Figures V to VIII, inclusive) journalled at its rear end on a respective crank of the master crankshaft 9.

Each tool carrier 44 is guided for sliding movement only in a plane which may be normal to the axis of rotation of the work, by vertical guides 78 at the front adjacent the work, and 80 at the rear. Each guide is bolted to the frame 7 as at 79. In the machine illustrated, the construction provides two guides on each side of each carrier 44. However, it will be understood that any other construction may be used so long as each tool carrier 44 is limited to movement in a plane as aforesaid.

Each tool carrier slidably supports a bar member 46 which at its forward end adjacent the workpiece, has a work-engaging roller 47. In operation, this roller normally rests upon the crank pin which its particular tool is turning.

Bar member 46 is positively guided by suitable guide members for straight line motion upon its main body portion 44, in a direction from front to rear of the machine, that is, in a direction substantially parallel to guideways 5 and 6. A roller 48 is carried by an overhanging bracket 75 attached to portions 44 by screws 76, Figure VII. This bracket carries a roller 48 in engagement with the smooth top surface 46a of bar 46 and, with roller 48, forms a support for main body portion 44 at its end remote from master crankshaft 9 so that, when operating, each body portion moves in an orbital path with its axis at all times substantially parallel to itself.

Each main body portion carries a tool T for operation upon the work, said tool having its cutting edge lying in a plane 49 passing through the axis P of the workpiece crank pin and parallel to the direction of sliding of body portion 44 upon and relative to bar member 46. It will be clear that this plane moves up and down as the workpiece and master-crankshaft rotate, but always remains substantially parallel to itself. The parts are so proportioned and arranged that the cutting edge of each tool T makes contact with the work at a position substantially 90° behind the position of the roller 47 upon the workpiece.

Thus it is clear that when roller 47 is resting upon the work, sliding bar member 46 acts through roller 48 to support the end of body portion 44 to maintain the cutting edge of tool T substantially in plane 49. In normal operation, therefore, the work itself acts to support the adjacent end of tool carrier or body portion 44 and, due to the fact that the throw of master crankshaft 9 is equal to that of the workpiece, roller 47 rests on the uppermost surface of its crank pin throughout the turning operation.

Obviously when there is no workpiece in the machine, the adjacent end of the tool carrier and its attached parts, will drop down into an inoperative position unless some supplemental means are provided to support said carrier during the interval while one workpiece is being removed and another loaded into the machine. Hence means are provided to act as a supplemental support to maintain each orbital tool carrier or main body portion with its longitudinal axis substantially parallel to plane 49 during loading of the lathe.

This supplemental support includes bar member 46, which is supported intermediate its ends by a journal box 50. The bar member 46 is provided with parallel, substantially vertical guide surfaces 51 which may, for example be in the form of a U-shaped notch in the member 46 itself, as shown at Figure VI. A cap extends over this notch and is secured to member 46 by cap screws to thereby complete a guideway, rectangular in cross section in which a journal box 50 fits for limited vertical sliding movement only. This limited vertical sliding movement is provided to take care of irregularities of the unfinished portions of the work piece as the roller 47 moves thereover, being limited to slightly more than greatest difference in crank pin radius, due to such irregularities, encountered in actual practice. However, said movement is so limited that the bar 46 and tool carrier 44 are at all times held in operative position, as when loading and unloading the machine.

Each journal box 50 rotatably fits a respective crank pin of a supplemental crankshaft 53 (see Figures II to VIII, inclusive). This supplemental crankshaft has the same number of cranks and each crank thereof has the same throw, as its counterpart on master crankshaft 9; and, of course, the respective cranks of supplemental and master crankshafts are in substantial alignment transversely of the machine. Crankshaft 53 is journaled in suitable bearings carried by a cradle 54, Figure V. This cradle slides on V-guides 55, Figures II and IV, on frame 7 whereby its motion relative to frame 7 is limited to a direction parallel to that of frame 7 upon ways 5 and 6. Means for actuating cradle 54 upon guides 55 are provided in the form of a power cylinder 56 on base 1 connected to a source of pressure fluid and driving a piston 57 and a piston rod 58 (see Figure IV). A rock shaft 61 is journalled in base 1 and extends between the sides thereof parallel to drive shaft 26. A bell crank lever 60 is fixed to one end of shaft 61 to rock therewith. A lever 62 is also fixed to the other end of said shaft 61. The free ends of said levers operate in respective vertically-sliding shoes 63 carried by feeding cradle 54 at locations adjacent respective guides 55. The effective distances between the axis of shaft 61 and the ends of levers 60 and 62 where they act upon shoes 63 is, of course the same. The other end of bell crank lever 60 is connected to piston rod 58 by a link 59. By this arrangement, as pressure fluid is fed to cylinder 56, piston 57 is moved thus driving rod 58, link 59 and rocking shaft 61 to correspondingly rock lever 62 whereby supplemental cradle 54 is translated over ways 55 toward and from the axis of rotation 20 of the workpiece. This translation, of course, also moves supplemental crankshaft 53 journal boxes 50 and sliding bar 46 whereby each work-engaging roller 47 may be moved over its supporting crank pin during a turning operation as shown in Figure IV, or retracted therefrom for loading to a position substantially as shown in Figure VI.

Supplemental crankshaft 53 is driven in synchronism with master crankshaft 9 and chucking devices 21 and 22, by mechanism now to be described. Worm wheels 65, Figure II, are attached to the respective ends of crankshaft 53. Worm boxes 67 are formed integrally with or rigidly attached to cradle 54 and a worm 66, is rotatably mounted in each box. Each worm meshes with a respective worm wheel 65. These worms 66 have splined bores to receive correspondingly splined drive shafts 68. These drive shafts are journaled in the housings 3 and 4. Each shaft has a bevel gear 70 at its end within the housing 3 or 4, meshing with and driven by, a bevel gear 71, fixed on respective shafts 29 and 29a, Figure II. Shaft 29 has been previously identified as the pulley shaft carrying the main drive pulley 30. This shaft is duplicated by a shaft 29a at the left side of the machine as viewed in Figure II said shaft being journaled in housing 3 and having a gear 28 fixed thereto and meshing with the gear 27 at the left of Figure II. Gear 27 has previously been described as fixed to drive shaft 26.

The gear ratios of this drive from main drive pulley 30 to supplemental crankshaft 53 are so selected that crankshaft 53 rotates in exact synchronism with master crankshaft 9 and the work spindles and, of course, the two crankshafts have the same number of throws and are so connected that the radial lines from the axis of rotation of each crankshaft, through the axis of corresponding cranks, on the two crankshafts, are parallel.

Operation

The operation of the machine will now be clear and may be briefly outlined as follows:

Figure VI illustrates the position of one tool carrier 44 and sliding bar member 46 after the workpiece W has been loaded into the machine but before any other operations have been performed; and it will be noted that the corresponding cranks of the workpiece, supplemental and master crankshafts, are all in lowermost position. It will also be noted that, in this position, bar member 46 and tool carrier 44 are supported (1) by master crankshaft 9 at the rear, and (2) supplemental crankshaft 53 at a mid point. Because of this fact, journal box 50 is at the top limit of its sliding movement along the vertical side faces 51 and the clearance 51a between the bottom of journal box 50 and the bottom of the rectangular notch in bar 46, is a maximum. Hence the end of carrier 44 and bar 46 adjacent the work have dropped slightly.

Fluid under pressure is now admitted to cylinder 56 thus moving piston 57 to the top, as shown in Figure VII. This movement rocks bell crank 60, shaft 61 and lever 62, to slide cradle 54 upon its ways 55 on feeding frame 7. As a result, supplemental crankshaft 53 together with bar member 46, are translated forwardly to a position where roller 47 rides onto crankpin P of the workpiece and comes to rest on the uppermost portion of said pin. It will be noted that, in this position, the end of member 46 adjacent the work, is supported by crankpin P. Hence all supporting load has been removed from journal box 50 and said journal is about midway of its limited sliding movement along side faces 51.

In this position it will be noted that, because of the aforesaid limited sliding of journal box 50 relatively to bar member 46, the ends of carrier 44 and member 46 may pivot slightly about the crank pin 45 on master crankshaft 9 whereby work-contacting roller 47 may ride over any irregularities in the unfinished work surfaces. In this position the tool carrier is still remote from the work and, as always, the tool end of carrier 44 is supported by roller 48 on the upper surface of member 46.

The driving motor 31 is now started and fluid under pressure is admitted to cylinder 10 thus driving piston 11, rod 12 and rack 13 to the right as seen in Figure III. This effects a rotation of gear 15 and pinion 16, thus feeding frame 7 and the tools on carriers 44 forwardly into the work as seen at Figure VIII. As soon as the motor 31 starts to rotate, the work piece W, and crankshafts 53 and 9 are all rotated in synchronism whereby the carrier 44 and bar member 46 are moved in an orbital path and the tool on each carrier 44 is maintained substantially in a horizontal plane through the axis of the crank on which it is operating and is fed into the work to the desired depth by appropriate control of the pressure fluid admitted to cylinder 10. The operations just described are then reversed, the finished piece is unloaded and another workpiece loaded into the lathe.

While the invention has been described in connection with a specific form of machine operating upon a particular workpiece, it will be realized that the machine may be modified in many different ways and may operate upon numerous different forms of work, without affecting the mode or principal of operation and that the invention extends to and includes all such modifications and substitutions as come within the scope of the subjoined claims.

Having thus described my invention, what I claim as new and desire to secure by Letters Patent is:

1. An orbital lathe comprising a base, a frame carried by said base for translation toward and from a work axis, a tool carrier having a longitudinal axis normal to said work axis, means on said frame mounting said carrier for movement in an orbital path so that said longitudinal axis remains substantially parallel to itself, said means including a bar member slidable on said carrier parallel to its said axis, said bar member being slidable to bring a portion thereof to be supported by a surface of the work being turned, means mounting said bar member on said frame for sliding movement, and means to slide said bar member to bring said portion into and out of work-supported position independently of said carrier.

2. In a lathe of the type described, a base having means in which a workpiece may be mounted for rotation on an axis, a frame on said base movable toward and from said axis, a tool carrier having an axis normal to said workpiece axis, a bar member slidably connected to said carrier for movement relatively thereto in a direction parallel to said tool carrier axis, means on said frame supporting said carrier at a point remote from the work axis, and moving the same in an orbital path, means on said member and adapted to be moved to rest on an orbitally moving portion of the work as said bar member is slid relatively to said tool carrier to thereby support said carrier at a second point and means to so slide the bar member relatively to the tool carrier whereby said member guides a tool on said carrier precisely into cutting relation with the work.

3. In an orbital type lathe, a base having means defining a work axis, a frame slidable on said base toward and from said axis, a cradle slidable on said frame toward and from said axis, a first crankshaft rotatable in said frame on an axis parallel to said work axis, a second crankshaft rotatable in said cradle on an axis parallel to said work axis, a tool carrier, means supporting said carrier upon said crankshafts for orbital movement and including a member slidably connected between said second crankshaft and said carrier, means on said member adapted to be moved therewith to rest on a work piece in said lathe, means for moving said cradle to so move said member to transfer the weight of said member and carrier otherwise supported by said second crankshaft, to said work piece, and means connecting said crankshafts for rotation synchronously with a work piece rotating on said axis.

4. In a lathe, a base, means on said base to receive and rotatably support a work piece upon a first axis, a frame slidably mounted on said base toward and from said axis, a master crankshaft rotatable on said frame on a second axis parallel to said first axis, a cradle slidably mounted on said frame toward and from said first axis, a second crankshaft on said cradle rotatable on a third axis parallel to said first axis, tool carrier means supported at one point upon a crank of said master crankshaft, bar means slidably connected to said tool carrier means, said bar means having a part adapted to rest upon a portion of said work piece and being pivoted on a crank of said second crankshaft and means connecting said crankshafts for simultaneous rotation whereby said tool carrier means may be moved in an orbital path in a plane having a predetermined angular relation to said first axis and means on said base to slide said cradle, second crankshaft and bar means, to cause said bar means to move independently of said carrier and to cause a portion thereof to rest upon and be supported by said work piece.

5. In an orbital lathe of the type described, a base having means defining a work axis of rotation, a frame on said base movable toward and from said axis, a first crankshaft journaled on said frame for rotation on a second axis parallel to said work axis, a cradle on said frame movable relatively thereto in a direction toward and from said work axis, a second crankshaft on said cradle, a tool carrier means, bar means slidably attached to said carrier means for relative straight line movement toward and from said work axis, said carrier means being journaled on one of said crankshafts, said bar means being journaled on the other of said crankshafts, support means on said bar to ride on a portion of the work to be turned when said bar is moved toward said work axis, and means positively moving said cradle on said frame to cause said support means to ride on said portion.

6. In an orbital lathe, a base having means to hold a workpiece for rotation about a work axis fixed relatively thereto, a frame supported on said base and shiftable in a first direction toward and from said axis, a cradle slidable on said frame in a direction parallel to said first direction, a tool carrier, a bar member, means connecting said carrier and member for straight line relative movement, means on said frame supporting and moving said carrier at one point in an orbital path lying in a first plane normal to said work axis, means on said cradle supporting and moving said bar member in a like orbital path in a plane parallel to said first plane, whereby a tool on said carrier moves in an orbital path in work-engaging relation to an orbitally moving part on said workpiece said bar having means to engage and ride on said orbitally moving part, means for shifting said frame on said base to feed the tool to the work, and means to move said cradle on said frame to move said bar into work-supported position.

7. In an orbital lathe, a base, spaced work spindles on said base to receive respective ends of a workpiece and rotate the same about a first axis, a frame slidable on said base toward and from said first axis, a master crankshaft journaled in said frame on an axis parallel to said first axis, a cradle movable on said frame toward and from said first axis, a supplemental crankshaft journaled in said cradle on an axis parallel to said first axis, tool carriers each mounted on corresponding crank of the master crankshaft, members slidably connected with each said carrier, respectively, and having means adapted to rest upon the work piece in one position, each member being journaled upon a respective crank of said supplemental crankshaft, means for moving said cradle and supplemental crankshaft on said frame to thereby move said members into said one position independently of said carriers, and means connecting said spindles and crankshafts for synchronous rotation.

8. In a lathe, a base having means to receive and rotate a work piece upon an axis, a feeding frame mounted on said base for translation only in a direction toward and from said axis, a cradle mounted on said frame for translation only parallel to said direction, a bar and a tool carrier connected for relative sliding in said direction, crank means on said cradle adapted to support said bar and thereby said carrier when said bar is retracted from said axis, crank means on said frame connected to said carrier, said bar having means to rest upon and be supported by a portion of said work piece to thereby support said carrier from the work piece when the cradle is translated upon the frame to advance the bar toward said axis and power means on said base to so translate said cradle.

9. In an orbital type lathe, having a base and means thereon to receive and rotate a work piece upon an axis, a frame slidable on said base in a direction toward and from said axis, a cradle slidable on said frame in said direction, a tool carrier and a bar member slidably connected for movement in said direction, synchronously rotating means on said cradle and said frame and pivotally connected to said member and carrier respectively, whereby said carrier and member are moved in an orbital path, said member having means adapted in one position of said member, to rest upon, and be supported by, an orbitally moving part of said work piece, and means for moving said cradle to move said member into said one position independently of said carrier.

10. In an orbital lathe having means to receive and rotate a work piece upon an axis eccentric to an orbitally moving surface to be cut, a bar member and a tool carrier connected for relative sliding movement toward and from said axis, said carrier being supported at its end adjacent the work by said member, means to rotate said member and carrier as a unit in an orbital path synchronously with said work piece, and means to move said member independently of said carrier so that the end of said member adjacent the work is supported on and by said surface.

11. In an orbital lathe having means to receive and rotate a work piece upon an axis eccentric to an orbitally moving surface to be cut, a bar member and a tool carrier connected for relative sliding movement toward and from said axis, said carrier being supported at its end adjacent the work by said member, means to rotate said member and carrier as a unit in an orbital path synchronously with said work piece, means to move said member independently of said carrier so that the end of said member adjacent the work is supported on and by said surface, and means to move said carrier to feed a tool thereon into the work independently of said member.

12. In an orbital lathe, a base having means for supporting a work piece for rotation on a work axis, a frame slidable on said base toward and from said axis, a first crankshaft on said frame rotatable on an axis parallel to said work axis, a tool carrier supported at one point on a crank of said crankshaft, a cradle slidable on said frame toward and from said axis, a second crankshaft journaled on said cradle on an axis parallel to said work axis, a bar member slidably connected with said carrier and supporting said carrier at a second point adjacent the work, said bar member being connected with a crank of said second crankshaft and adapted to be supported thereby when in one position, means on said base to shift said cradle and said second crankshaft to move said member into a second position independently of said tool carrier wherein a roller on one end of said member rests upon and is supported by an orbitally moving surface of the work piece to be turned, and means operable to feed said frame and carrier independently of said member said carrier being guided by said member during feeding.

13. In an orbital lathe, a base having means for supporting a work piece for rotation on a work axis, a frame slidable on said base toward and from said axis, means for sliding said frame, a first crankshaft on said frame rotatable on an axis parallel to said work axis, a tool carrier supported at one point on a crankpin of said crankshaft, a cradle on said frame movable toward and from said work axis, a second crankshaft on said cradle rotatable on an axis parallel to said work axis, means supporting said carrier at a second point on a crankpin of said second crankshaft, including a bar member slidably connected with said carrier for independent movement relative thereto toward and from said work axis, means for slidably actuating said bar member, said member being adapted to engage and be supported independently of said second crankshaft by an orbitally moving surface of the work being turned when moved to a predetermined position relative to said work axis, means to actuate said cradle independent of said frame, and means for rotating said crankshafts and the work piece in synchronism.

WILLIAM F. GROENE.

REFERENCES CITED

The following references are of record in the file of this patent:

UNITED STATES PATENTS

| Number | Name | Date |
|---|---|---|
| 1,919,738 | Melling | July 25, 1933 |
| 2,069,426 | Smith | Feb. 2, 1937 |
| 2,289,215 | Sears | July 7, 1942 |
| 2,089,421 | Pierle | Aug. 10, 1937 |
| 2,233,977 | Groene | Mar. 4, 1941 |

FOREIGN PATENTS

| Number | Country | Date |
|---|---|---|
| 539,943 | Great Britain | Sept. 30, 1941 |
| 687,577 | Germany | Feb. 1, 1940 |